Sept. 21, 1948.    L. A. TOLES    2,449,960
LEVER OPERATED AXIALLY SHIFTING
TIRE REMOVING DEVICE Filed May 3, 1945    2 Sheets-Sheet 1

INVENTOR.
LOUIS A. TOLES
BY Victor J. Evans & Co.
ATTORNEYS

Sept. 21, 1948.  L. A. TOLES  2,449,960
LEVER OPERATED AXIALLY SHIFTING
TIRE REMOVING DEVICE Filed May 3, 1945  2 Sheets-Sheet 2

INVENTOR.
LOUIS A TOLES

BY *Victor J. Evans & Co.*
ATTORNEYS

Patented Sept. 21, 1948

2,449,960

UNITED STATES PATENT OFFICE 2,449,960

LEVER OPERATED AXIALLY SHIFTING TIRE REMOVING DEVICE

Louis A. Toles, Ridgeville Corners, Ohio

Application May 3, 1945, Serial No. 591,647

1 Claim. (Cl. 157—1.26)

This invention relates to tire tools, and more particularly, to a device for removing a tire bead from wheels provided with safety rims.

As is well known, said safety rims are provided with complementary beads which hold the tire in place even though the tire becomes deflated.

Safety rims have been developed as an improvement over regular auto wheels to prevent tires from leaving the rim should a tire become punctured or blow out. However, the new safety rim so securely retains the bead of the tire in the groove formed by the complementary bead on the rim that it has been very difficult in the past to remove the tire bead from a rim of this type with the tools now in existence. This tool was developed therefore to overcome the effort required to remove a tire bead from such a rim.

One object of the invention being to provide a simple but efficient device which is portable and can be held in position by the weight of the tire and wheel from which the tire is being removed.

Another object of the invention is to provide a device which can be manufactured of low cost stock material and yet stand rough usage without danger of breakage or damage of any kind.

A further object of the invention is to provide a device which by the use of a series of levers effectively and quickly removes a tire bead from the complementary bead of a safety wheel.

With these and other objects in view, the invention consists of certain novel features of construction and combination of parts as hereinafter set forth and pointed out in the appended claim.

In the accompanying drawings forming a part of this specification and in which like numerals are employed to designate corresponding parts throughout—

Figure 3 is a detailed side elevation of the tire tool showing the device preparatory to removing the tire (shown in section) from the rim.

Figure 4 is a front view of the spoon shaped member of the tire tool.

Figure 5 is a side elevation of the same.

Figure 8 is a modification of the invention.

Figure 1:
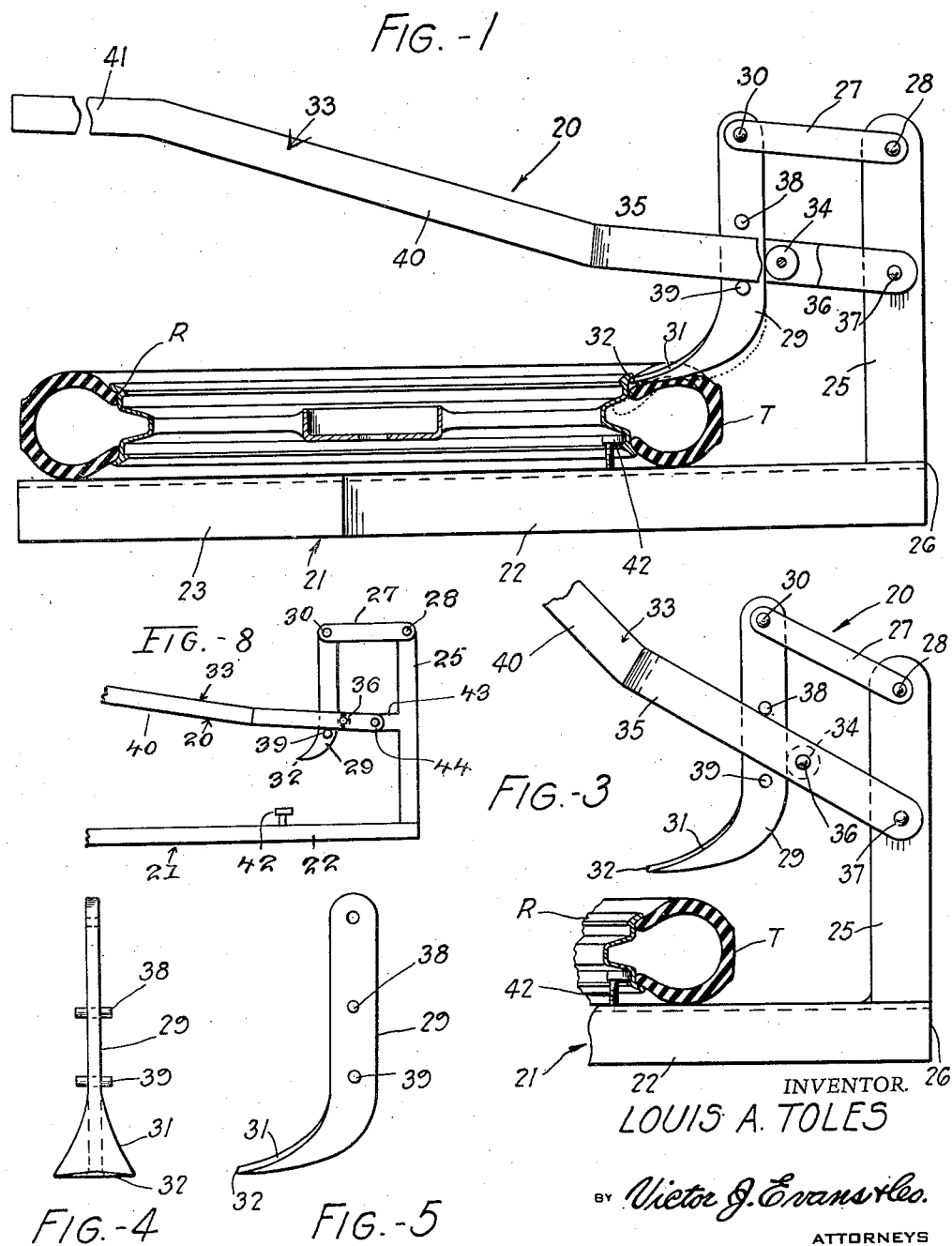
Figure 1 is a side elevation of the tire tool in use removing a tire (shown in section) from a wheel rim.
Figure 2:
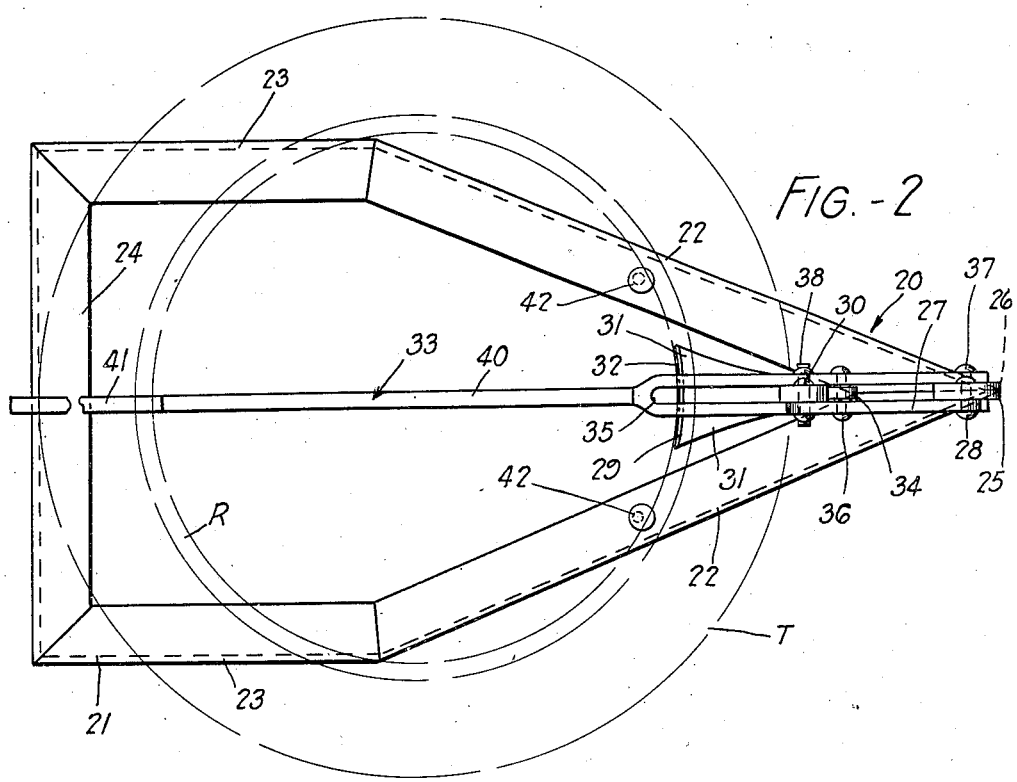
Figure 2 is a top plan view of the same with a tire in position for removal from the rim.
Figure 6:
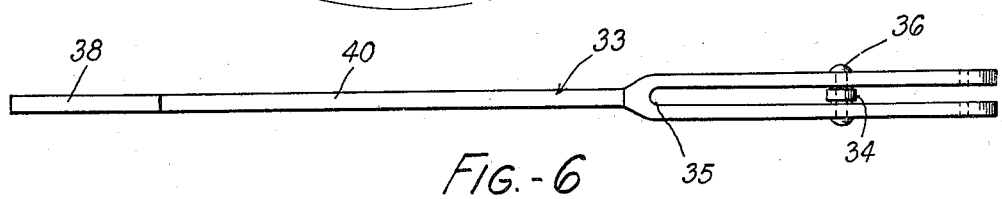
Figure 6 is a top plan view of the handle of the device.
Figure 7:
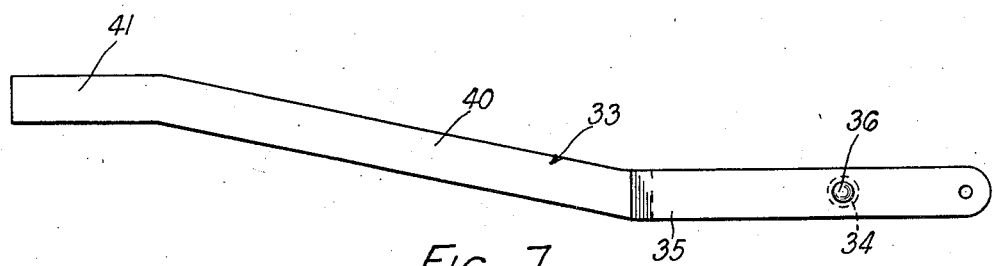
Figure 7 is a side elevation of the same.

Referring more in detail to the drawings wherein for the purpose of illustration is shown a preferred example of the invention 20 designates a tire tool having a portable base or platform 21 which is preferably made of metal, and is of sufficient length to accommodate and support the lower surface of a tire and wheel when the tire is being removed from the wheel.

The platform 21 is made in the shape of a pentagon having two angular sides 22, joined at one end thereof with the straight sides 23. The side 23 having a base side 24 joined at right angles thereto. The lower end of a standard 25 is attached to and projects upwardly from the apex 26 of the angular sides 22 at right angles thereto, and one end of a link 27 is pivotally attached to the upper end of the standard 25 by a pivot pin 28.

A downwardly curved more or less spoon-shaped finger or dog 29 is pivotally attached to the other end of the link 27 by a pivot pin 30. The spoon shaped end of the dog 29 is adapted to engage the tire and rim mounted upon the base 21 forwardly of the standard 25.

The dog 29 consists of a portion curved concentric to the tire and rim and provided at the forward end with extending portions 31 to form what may be termed an elongated spoon 32.

A bifurcated handle or lever 33 having a roller 34 rotatably mounted in the bifurcated portion 35 on pin 36 is pivotally mounted on the standard 25 by a pivot pin 37.

The dog 29 is positioned in the bifurcated portion 35 of the handle 33 and the rear edge of the dog is adapted to slidably contact the roller 34.

The dog 29 has a pin 38 positioned in spaced relationship to the upper edge of the handle 33 and the handle 33 when it is moved upward raises the dog 29 by means of the pin 28. A pin 39 is positioned in spaced relation to the lower edge of the handle 33 in the dog 29 and when pressure is applied to the handle 33 it moves the dog 29 downward and exerts pressure thereon in proportion to the pressure applied on the handle 33.

In order that sufficient room is allowed for the operator's hand and in order that more pressure may be applied thereto the handle 33 is provided with an inclined portion 40 intermediate the bifurcated portion 35 and the grip portion 41. The grip portion 41 and bifurcated portion 35 extending horizontally from the upper and lower ends of the inclined portion 40 of the handle 33 respectively.

In order that the rim and that portion of the tire which is connected therewith shall be properly positioned on the platform 21 eccentric screw-threaded bolts 42 are positioned in the angular sides 22 of the platform 20. The eccentric head of the bolt 42 is formed to conform with the curvation of the various sized rims from which the tires are to be removed.

With the construction and arrangement of parts, as above described, it will be seen that when the wheel W and tire T are positioned on the platform 21 with the rim R contacting the bolts 42 and the handle 33 is lowered the spoon point 32 of the dog 29 will rest on the upper side of the tire T at the point where bead and rim flange meet.

As the handle 33 is lowered, the link arrangement of the tire tool 20 will push the spoon point 32 under the rim between the tire and the rim till it touches the base of the rim and the handle 33 contacts the pin 39. Further downward pressure on the handle 33 will force the bead out of the rim base into the drop center of the wheel, the pin 39 and roller 34 maintaining the spoon point 32 in the proper position with respect to the tire and rim. When the handle 33 is raised upward and backward from the rim, the tire and rim may be moved step by step until the entire upper bead shall have been loosened and then the tire can be completely turned over to loosen the lower bead.

Referring to Figure 8, the standard 25 is provided at approximately the medial point of the inner side thereof with an inwardly projecting arm 43 to which the handle or lever 33 is pivotally connected by a pivot pin 44.

The arm 43 is of sufficient length to permit the spoon 32 to clear the rim R when the lever 33 is lowered.

By omitting the upper pin 38, the handle 33 can be turned upwardly and the grip portion 41 positioned to the rear of the standard 25 thus permitting the tire T to be placed on the tire tool 20 without interference from the handle 33.

The removal of the tire may be accomplished rapidly and expeditiously without disfiguring, marring, or scratching the rim tire or bead.

It is to be understood that the form of the invention herewith shown and described is to be taken as a preferred example of the same and that various changes relative to the material, size, shape and arrangement of parts may be resorted to without departing from the spirit of the invention or the scope of the subjoined claim.

What is claimed is:

A tire tool comprising a platform, said platform being of sufficient length to support a tire and wheel assembly thereon, a standard extending upwardly from the platform, a handle having a bifurcated portion pivoted on said standard, a link pivoted to the upper end of said standard in spaced relation to said handle, a dog pivoted to and depending from the forward end of said link, passing through said bifurcated portion of the handle and having its lower end extending outwardly to form an elongated spoon to engage the upper edge of the rim of said tire, a roller in the bifurcated portion of said handle adapted to slidably contact the rear edge of said dog, pins extending outwardly of said dog adapted to contact the lower and upper edges of said handle when said handle is raised and lowered to remove the tire from said wheel.

LOUIS A. TOLES.

REFERENCES CITED

The following references are of record in the file of this patent:

UNITED STATES PATENTS

| Number | Name | Date |
|---|---|---|
| 1,447,113 | Woodhall | Feb. 27, 1923 |
| 1,567,276 | Kowalzcyk et al. | Dec. 29, 1925 |
| 1,591,193 | Weaver | July 6, 1926 |
| 1,902,283 | Jackson et al. | Mar. 21, 1933 |
| 2,319,155 | Passanante et al. | May 11, 1943 |